US009950742B2

(12) United States Patent
Choi et al.

(10) Patent No.: US 9,950,742 B2
(45) Date of Patent: Apr. 24, 2018

(54) PARKING GUIDANCE APPARATUS AND METHOD OF VEHICLE

(71) Applicant: Hyundai Motor Company, Seoul (KR)

(72) Inventors: Jae Seob Choi, Suwon-si (KR); Eu Gene Chang, Gunpo-si (KR); Jin Wook Choi, Goyang-si (KR); Dae Joong Yoon, Hwaseong-si (KR); Seong Sook Ryu, Seoul (KR)

(73) Assignee: Hyundai Motor Company, Seoul (KR)

( * ) Notice: Subject to any disclaimer, the term of this patent is extended or adjusted under 35 U.S.C. 154(b) by 7 days.

(21) Appl. No.: 15/134,066

(22) Filed: Apr. 20, 2016

(65) Prior Publication Data

US 2017/0080976 A1 Mar. 23, 2017

(30) Foreign Application Priority Data

Sep. 21, 2015 (KR) .................. 10-2015-0133230

(51) Int. Cl.
*B62D 15/02* (2006.01)
*G01S 15/93* (2006.01)

(52) U.S. Cl.
CPC .... *B62D 15/0275* (2013.01); *G01S 2015/933* (2013.01)

(58) Field of Classification Search
CPC ............ B62D 15/0285; B62D 15/0275; B62D 15/028; B62D 15/027; B62D 15/0295; G01S 17/026; G01S 17/87; G01S 7/497; G08G 1/168; G08G 1/14; G08G 1/16; G08G 1/161; G08G 1/165; B60T 2201/10; B60W 10/20; B60W 2420/403; B60W 30/06; B60W 50/14; B60R 1/00; B60R 2300/806

USPC ......... 701/1, 7.31, 25, 33.4, 36, 41, 42, 300, 701/532; 348/118, 148, 932.2; 180/167
See application file for complete search history.

(56) References Cited

U.S. PATENT DOCUMENTS

| 2002/0147543 | A1* | 10/2002 | Gieseke | G08G 1/14 701/532 |
| 2003/0032478 | A1* | 2/2003 | Takahama | A63F 13/04 463/30 |
| 2004/0153243 | A1* | 8/2004 | Shimazaki | B62D 15/0275 701/300 |
| 2006/0247834 | A1* | 11/2006 | Shimazaki | B62D 15/021 701/36 |

(Continued)

FOREIGN PATENT DOCUMENTS

| JP | 2007-276590 A | 10/2007 |
| KR | 10-0974704 B | 8/2010 |

(Continued)

*Primary Examiner* — Anne M Antonucci
*Assistant Examiner* — Sanjeev Malhotra
(74) *Attorney, Agent, or Firm* — Brinks Gilson & Lione

(57) ABSTRACT

There are provided a parking guidance apparatus and method. The parking guidance apparatus is configured to recognize parking spaces in which a vehicle is to be parked within a parking lot, to set any one of the recognized parking spaces to a target parking space, to calculate a one-step parking route and a multi-step parking route depending on a steering input of a driver, to display guidance markers corresponding to the one-step parking route and the multi-step parking route so as to be distinguished from each other, and to guidance parking on the basis of the guidance markers.

14 Claims, 18 Drawing Sheets

(56) References Cited

U.S. PATENT DOCUMENTS

| | | | | |
|---|---|---|---|---|
| 2006/0255969 | A1* | 11/2006 | Sakakibara | G08G 1/161 340/932.2 |
| 2007/0010918 | A1* | 1/2007 | Shimazaki | B62D 15/0275 701/1 |
| 2007/0146164 | A1* | 6/2007 | Schmid | G08G 1/161 340/932.2 |
| 2007/0273554 | A1* | 11/2007 | Sakakibara | B62D 15/0275 340/932.2 |
| 2008/0158011 | A1* | 7/2008 | Yamanaka | B62D 15/0275 340/932.2 |
| 2008/0174452 | A1* | 7/2008 | Yamamoto | B62D 15/0275 340/932.2 |
| 2008/0266137 | A1 | 10/2008 | Son | |
| 2009/0118900 | A1* | 5/2009 | Adachi | B62D 15/027 701/33.4 |
| 2009/0167564 | A1* | 7/2009 | Long-Tai | B62D 15/0285 340/932.2 |
| 2009/0260907 | A1* | 10/2009 | Moshchuk | B62D 15/0285 180/167 |
| 2010/0013670 | A1* | 1/2010 | Hueppauff | B62D 15/0275 340/932.2 |
| 2010/0017178 | A1* | 1/2010 | Tsuk | G01B 11/24 703/6 |
| 2010/0049402 | A1* | 2/2010 | Tanaka | B60R 1/00 701/41 |
| 2010/0211267 | A1 | 8/2010 | Shimazaki et al. | |
| 2010/0235053 | A1* | 9/2010 | Iwakiri | B62D 15/027 701/42 |
| 2010/0309024 | A1* | 12/2010 | Mimeault | G08G 1/04 340/932.2 |
| 2011/0054739 | A1* | 3/2011 | Bammert | B62D 15/028 701/41 |
| 2011/0080305 | A1* | 4/2011 | Toledo | B62D 15/028 340/932.2 |
| 2011/0082613 | A1* | 4/2011 | Oetiker | B60W 10/20 701/25 |
| 2011/0093168 | A1* | 4/2011 | Barth | B62D 15/028 701/41 |
| 2011/0156928 | A1* | 6/2011 | Ghisio | B62D 15/028 340/932.2 |
| 2012/0072067 | A1* | 3/2012 | Jecker | B62D 15/0285 701/25 |
| 2012/0314056 | A1* | 12/2012 | Michiguchi | B60W 30/18036 348/118 |
| 2012/0316732 | A1* | 12/2012 | Auer | B62D 15/0265 701/41 |
| 2013/0073119 | A1* | 3/2013 | Huger | B62D 15/027 701/1 |
| 2013/0120578 | A1* | 5/2013 | Iga | B60R 1/00 348/148 |
| 2014/0067207 | A1 | 3/2014 | Noh | |
| 2014/0139677 | A1* | 5/2014 | Lambert | B60K 35/00 348/148 |
| 2014/0228060 | A1* | 8/2014 | Abhyanker | G06Q 10/087 455/457 |
| 2015/0227414 | A1* | 8/2015 | Varma | G06F 11/073 714/47.1 |
| 2015/0227952 | A1* | 8/2015 | Dance | G06Q 30/0202 705/7.31 |
| 2015/0307089 | A1* | 10/2015 | Vorobieva | B62D 15/027 701/25 |
| 2016/0210860 | A1* | 7/2016 | Belzner | G08G 1/147 |
| 2016/0240082 | A1* | 8/2016 | Mielenz | G08G 1/141 |
| 2016/0358383 | A1* | 12/2016 | Gauglitz | G06T 19/006 |

FOREIGN PATENT DOCUMENTS

| | | |
|---|---|---|
| KR | 10-1084025 B | 11/2011 |
| KR | 10-2011-0134173 A | 12/2011 |
| KR | 10-2013-0037273 A | 4/2013 |
| KR | 10-1365498 B | 3/2014 |

* cited by examiner

PARKING GUIDANCE APPARATUS AND METHOD OF VEHICLE

CROSS-REFERENCE TO RELATED APPLICATION

The present application claims the benefit of Korean Patent Application No. 10-2015-0133230, filed on Sep. 21, 2015 in the Korean Intellectual Property Office, the disclosure of which is incorporated herein in its entirety by reference.

TECHNICAL FIELD

The present disclosure relates to a parking guidance apparatus, and more particularly, to a parking guidance apparatus and a method of a vehicle of recognizing empty parking spaces within a parking lot to set a target parking space, tracking the target parking space, and providing parking guidance to a driver on the basis of tracking information.

BACKGROUND

Generally, parking guidance systems measure a length of a parking space to inform whether or not a vehicle may be parked, and display only a guidance line on a screen on the basis of a current steering value when a driver steers a steering handle. Most of the parking guidance systems according to the related art described above, which are rear camera based systems, are not intuitive, and actually have low usability.

In addition, since the parking guidance system according to the related art displays a parking trajectory by a guidance line to perform guidance, an oppressive sensation that it seems like the vehicle should be parked along the guidance line is generated, and it is impossible to cope with the case in which the driver may not park the vehicle along the guidance line.

In addition, since the parking guidance system according to the related art should be controlled depending on a determined formula, adaptive guidance depending on a surrounding situation is impossible, and an option for a parking control trajectory is not provided to the driver.

SUMMARY

The present disclosure has been made to address the above-mentioned problems occurring in the prior art while advantages achieved by the prior art are maintained intact.

An aspect of the present disclosure provides a parking guidance apparatus and a method of a vehicle of recognizing empty parking spaces within a parking lot to set a target parking space, tracking the target parking space, and providing parking guidance to a driver on the basis of tracking information.

In one exemplary form of the present disclosure, a parking guidance method includes: recognizing parking spaces in which a vehicle is to be parked within a parking lot; setting any one of the recognized parking spaces to a target parking space; calculating a one-step parking route and a multi-step parking route depending on a steering input of a driver; displaying guidance markers corresponding to the one-step parking route and the multi-step parking route so as to be distinguished from each other; and guiding parking on the basis of the guidance markers.

In another exemplary form of the present disclosure, a parking guidance apparatus includes: an image acquirer configured to acquire an image around a vehicle; a distance sensor configured to sense an obstacle around the vehicle; a display configured to display various information; and a controller configured to control operations of the image acquirer, the distance sensor, a steering angle sensor, and the display, wherein the controller recognizes parking spaces in which a vehicle is to be parked within a parking lot through the image acquirer and the distance sensor, sets any one of the recognized parking spaces to a target parking space, calculates a one-step parking route and a multi-step parking route depending on a steering input of a user, displays guidance markers corresponding to the calculated one-step parking route and multi-step parking route on the display so as to be distinguished from each other, and guides parking on the basis of the guidance markers.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary forms of the present disclosure will be described in detail with reference to the accompanying drawings.

Figure 1:
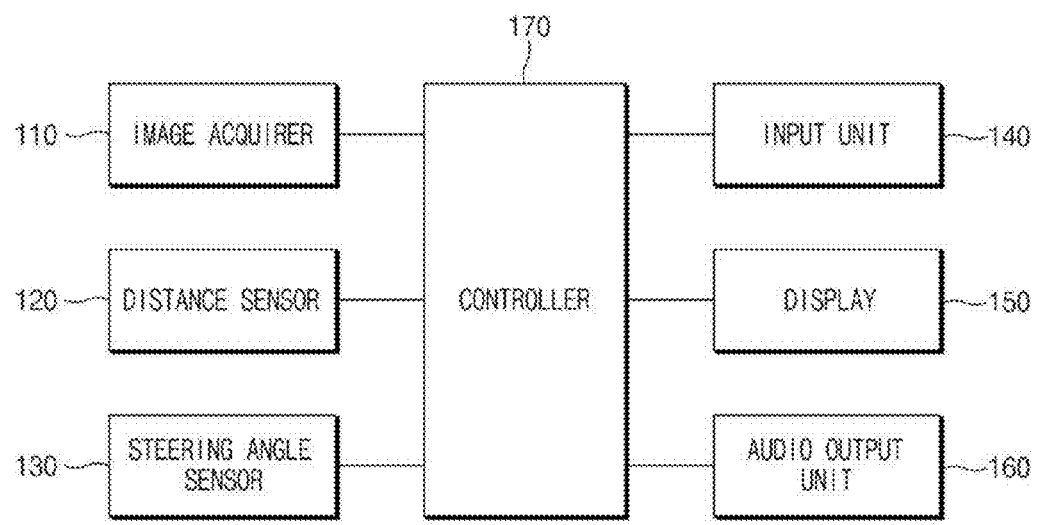
FIG. 1 is a block diagram illustrating a configuration of a parking guidance apparatus.

FIG. 1 is a block diagram illustrating a configuration of a parking guidance apparatus.

As illustrated in FIG. 1, the parking guidance apparatus is configured to include an image acquirer 110, a distance sensor 120, a steering angle sensor 130, an input unit 140, a display 150, an audio output unit 160, and a controller 170.

The image acquirer 110 includes two or more image sensors, and photographs an image around a vehicle. For example, the image acquirer 110 includes a front camera, a rear camera, and two side cameras.

The image acquirer 110 includes an image processor (not illustrated) converting images acquired from the respective image sensors into one top view image.

The distance sensor 120 measures a distance between an obstacle (for example, a vehicle, a building, a tree, or the like) around the vehicle and the vehicle. Therefore, the parking guidance apparatus confirms a position of the obstacle around the vehicle through the distance sensor 120.

In addition, the distance sensor 120 is used to search empty parking spaces (parking sections). The distance sensor 120 is configured of any one or more of an ultrasonic sensor, a laser detection and ranging (LADAR) sensor, a light detection and ranging (LIDAR) sensor, and the like.

The steering angle sensor 130 measures a steering angle by a steering wheel manipulation of a user (for example, a driver).

The input unit 140 generates data depending on a user input. The input unit 140 may be implemented by any one or more of input means such as a button, a keypad, a toggle, a touch pad, and the like.

The display 150 displays information depending on an operation of the parking guidance apparatus. In the case in which the display 150 and a sensor sensing a touch operation are combined with each other, the display 150 may be used as an input apparatus as well as an output apparatus.

The audio output unit 160 outputs an audio signal for warning and parking guidance to the outside through a speaker.

The controller 170 recognizes parking spaces in which the vehicle may be parked within a parking lot through the image acquirer 110 and the distance sensor 120. The controller 170 maps the recognized parking spaces to the image acquired through the image acquirer 110, and visually displays the parking spaces so that the user may recognize the corresponding parking spaces. For example, the controller 170 displays visual information such as icons, figures, arrows, or the like, at positions corresponding to the parking spaces in the acquired image.

The controller 170 sets any one of the recognized parking spaces to a target parking space depending on a user input received through the input unit 140. Here, the controller 170 sets the target parking space in a state in which the vehicle stops. The controller 170 matches the target parking space selected by the user with the acquired image to display visual information (for example, an image, an arrow, a figure, or the like).

The controller 170 provides a parking trajectory depending on a steering input of the user. When the user manipulates a steering wheel to perform the steering input, the controller 170 senses the steering input (steering angle) of the user through the steering angle sensor 130.

The controller 170 senses vehicle signals using sensors provided in the vehicle, and confirms a stop point in time of the vehicle on the basis of the vehicle signals. For example, the controller 170 confirms whether or not a vehicle speed is 0 km/h or whether or not a change amount in a wheel rotation angle is 0 degree to determine whether or not the vehicle is in a stop state.

The controller 170 generates one or more parking routes through which the vehicle is to be parked from a point at which the vehicle stops (current position) to the target parking space. In this case, the controller 170 senses the steering input through the steering angle sensor 130 in the stop state of the vehicle, and calculates a one-step parking route and/or a multi-step parking route depending on the steering input. In addition, the controller 170 displays the calculated one-step parking route and/or multi-step parking route on a display screen so as to be visually distinguished from each other. For example, the controller 170 displays the one-step parking route and the multi-step parking route by different colors.

Here, the one-step parking route is a route through which the vehicle may be parked in the target parking space by performing a steering manipulation once, and the multi-step parking route is a route through which the vehicle may be parked in the target parking space by performing a steering manipulation twice or more.

The controller 170 determines whether or not guidance of the one-step parking route and/or the multi-step parking route is possible on the basis of a steering ratio and the position of the obstacle.

The controller 170 displays the one-step parking route and/or the multi-step parking route calculated depending on the steering input on the display 150. Then, in the case in which the driver selects a parking route through the steering input and then inputs a confirmation button of the input unit 140 or the vehicle moves, the controller 170 sets (fixes) the parking route to the selected route.

The controller 170 provides forward movement or backward movement guidance so that the vehicle may be parked from a current position thereof to the target parking space depending on shifting (forward gear or backward gear).

Figure 2:
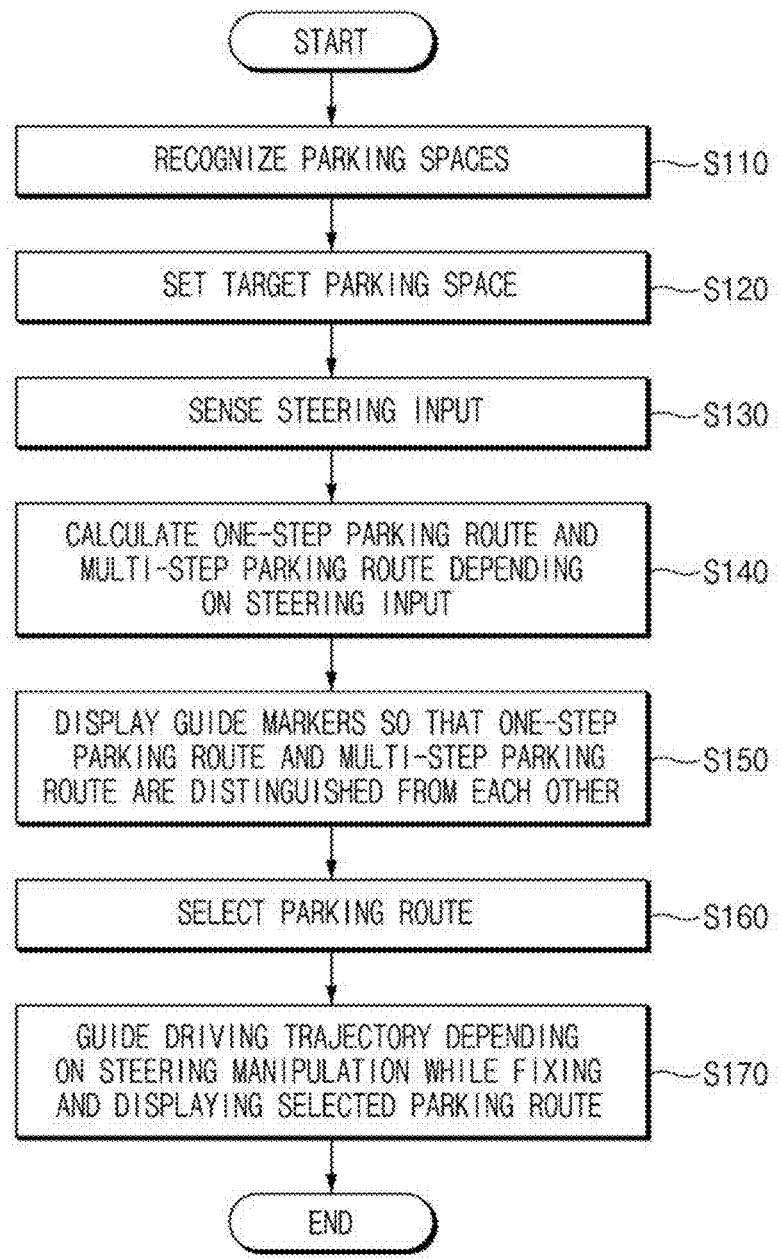
FIG. 2 is a flow chart illustrating a parking guidance method.

FIG. 2 is a flow chart illustrating a parking guidance method according to an exemplary embodiment of the present disclosure.

As illustrated in FIG. 2, the controller 170 of the parking guidance apparatus recognizes the parking spaces in which the vehicle may be parked within the parking lot through the image acquirer 110 and the distance sensor 120 (S110). That is, the controller 170 searches empty parking spaces in which vehicles are not parked. In addition, the controller 170 maps and displays the recognized parking spaces to and on the image acquired through the image acquirer 110.

The controller 170 sets any one of the recognized parking spaces to the target parking space (S120). In this case, the controller 170 sets the target parking space depending on the user input, and displays a marker corresponding to the set target parking space on the acquired image.

Then, the controller 170 senses the steering input in a state in which the vehicle stops (S130).

The controller 170 calculates the one-step parking route and/or the multi-step parking route depending on the steering input (S140).

The controller 170 displays guidance markers so that the one-step parking route and/or the multi-step parking route are distinguished from each other (S150).

The controller 170 selects the parking route through the steering input (S160).

The controller 170 guides the parking trajectory depending on the steering input while fixing and displaying the selected parking route (S170).

Figure 3:
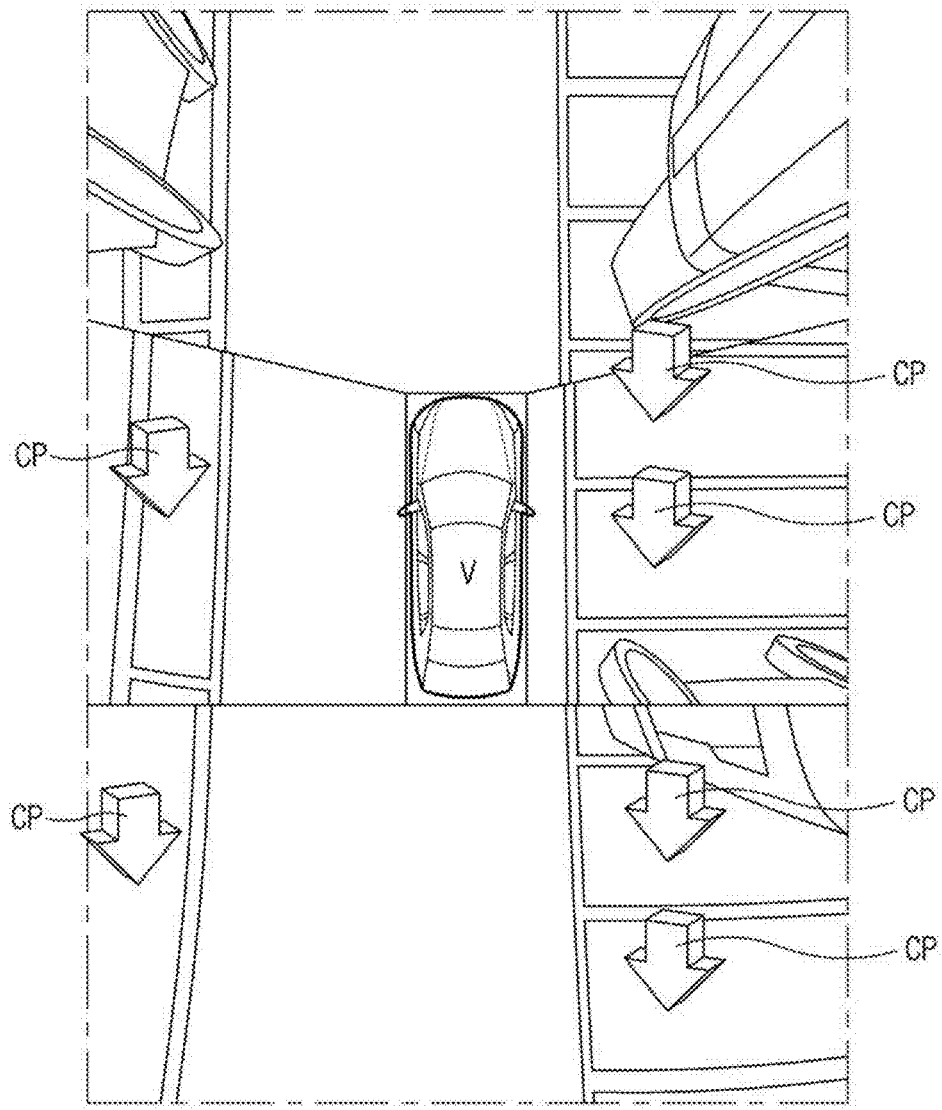
FIGS. 3 and 4 are views for describing a target parking space setting process.
Figure 4:
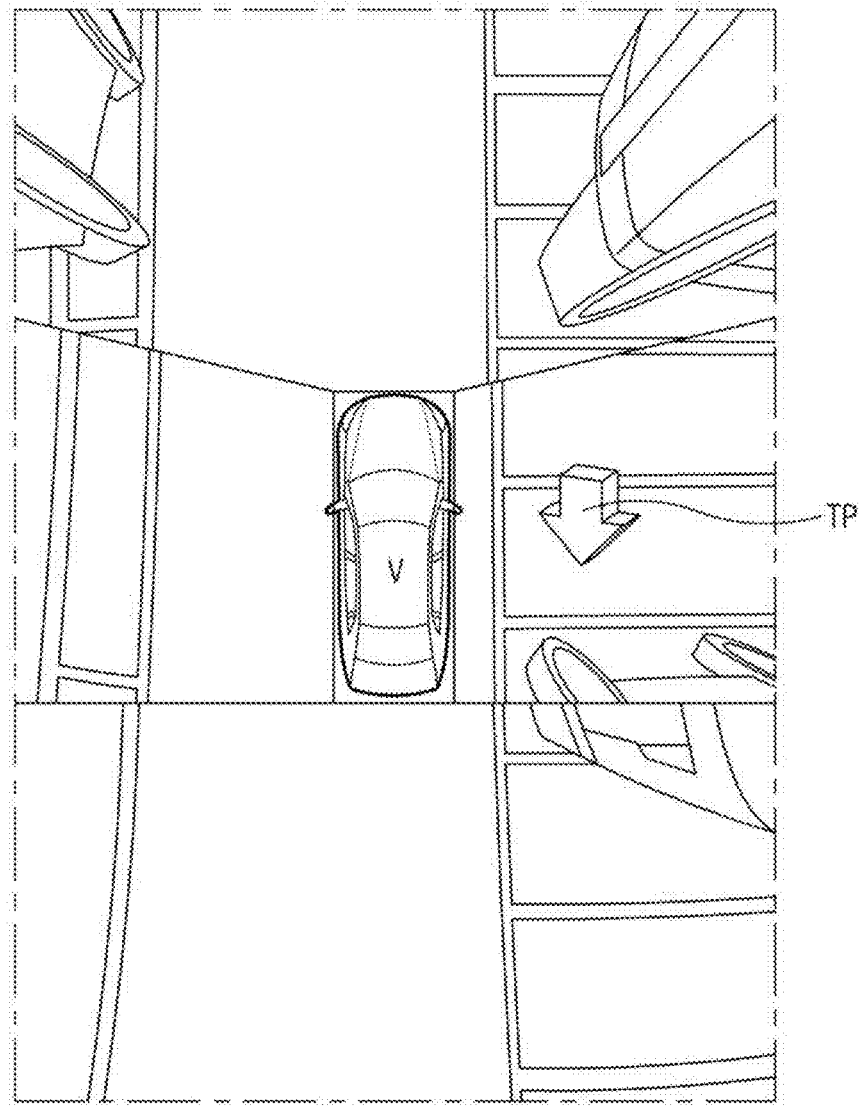

FIGS. 3 and 4 are views for describing a target parking space setting process.

The controller 170 recognizes the parking spaces (parking sections) in which the vehicle may be parked through the image acquirer 110 and the distance sensor 120. In addition, the controller 170 maps the recognized parking spaces to the image photographed through the image acquirer 110 to display markers CP, as illustrated in FIG. 3.

Then, when the driver selects any one of the recognized parking spaces, the controller 170 sets the parking space selected by the driver to the target parking space. In addition, the controller 170 releases the display of the markers CP indicating the recognized parking spaces, and displays a marker TP indicating the set target parking space, as illustrated in FIG. 4. In this case, the controller 170 tracks the corresponding target parking space to display the marker TP, until the parking of the vehicle in the set target parking space is completed, such that the parking guidance ends.

FIGS. 5 to 8 are views for describing a guidance marker displaying method depending on a steering manipulation of a driver.

When the vehicle stops, the controller 170 senses the steering input through the steering angle sensor 130. In addition, the controller 170 calculates the one-step parking route and/or the multi-step parking route depending on the sensed steering input. In this case, the controller 170 calculates the one-step parking route through which the vehicle may be parked by performing the steering manipulation once and the multi-step parking route through which the vehicle may be parked by performing the steering manipulation twice or more. The controller 170 provides parking guidance information on the basis of the calculated parking route.

Figure 5:
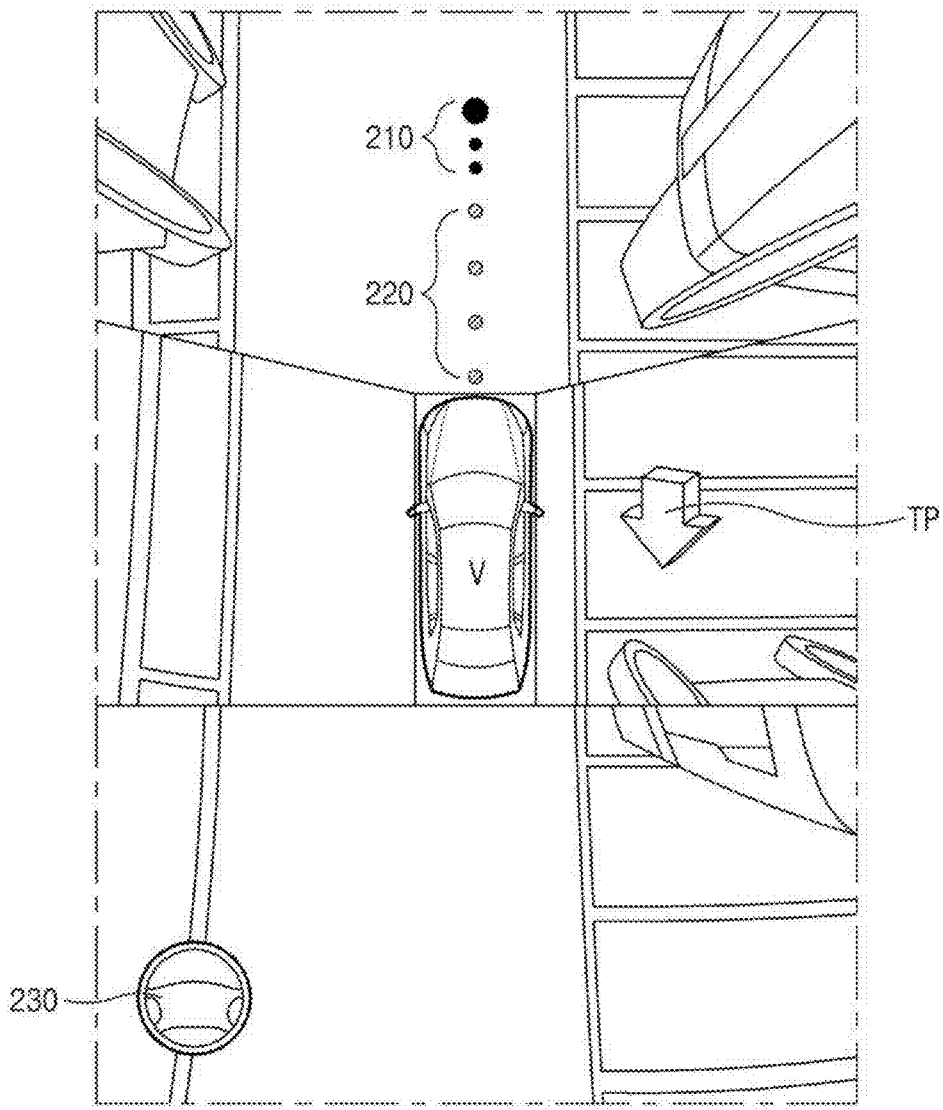
FIGS. 5 to 8 are views for describing a guidance marker displaying method depending on a steering manipulation of a driver.
Figure 6:
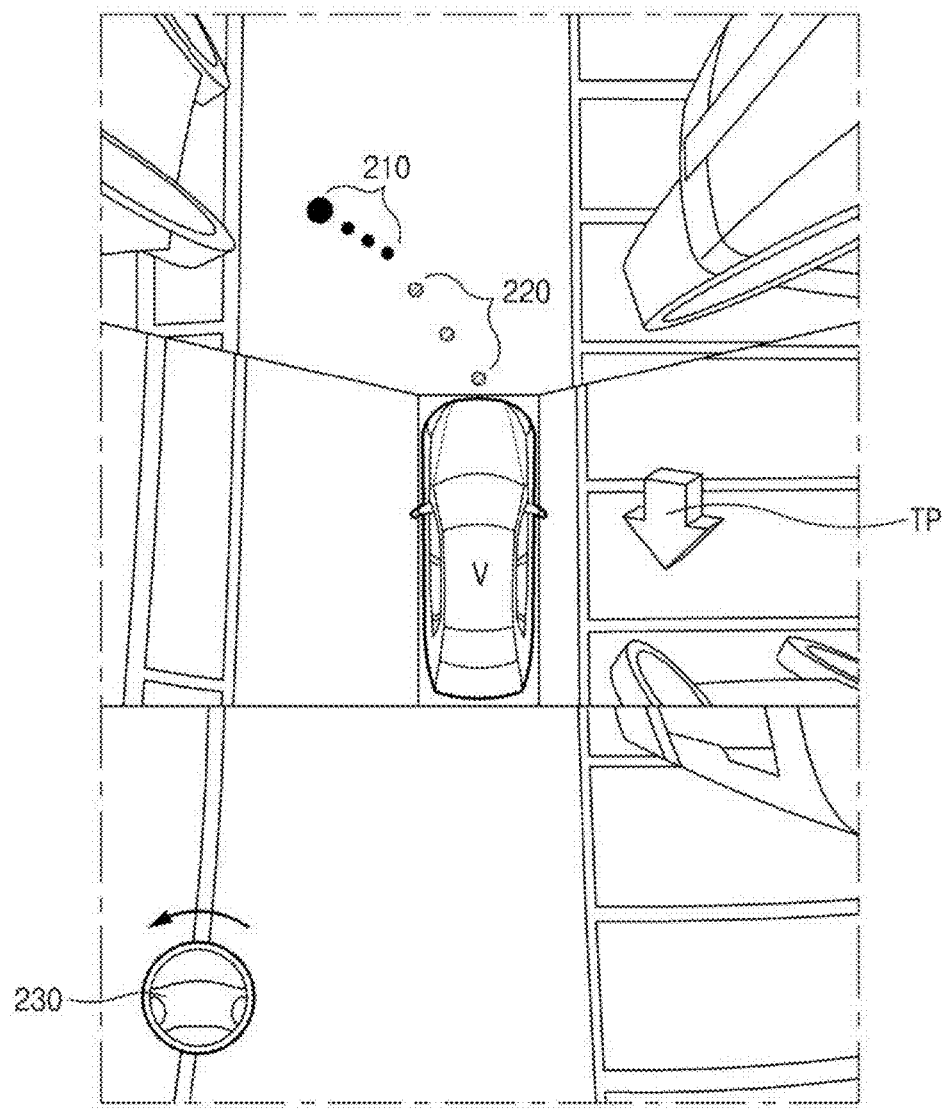

As illustrated in FIGS. 5 and 6, the controller 170 displays different guidance markers 210 and 220 along the one-step parking route and the multi-step parking route. The controller 170 displays the guidance markers 210 at predetermined intervals along the one-step parking route, and displays the guidance markers 220 at predetermined intervals along the multi-step parking route.

In this case, the controller 170 also displays the received steering input as a handle image 230 at one point on the display 150. The controller 170 continuously displays the marker TP corresponding to the target parking space.

Meanwhile, when the steering wheel rotates in a direction in which the target parking space TP is positioned in a state in which the driver is to park the vehicle V in the parking space TP positioned at the right of the vehicle V, the controller 170 guides that parking guidance depending on the steering input of the driver is impossible when generation of a parking route depending on a current input of the steering wheel is impossible. In this case, the controller 170 may output an audio guidance message while displaying a trajectory 240 depending on the steering input.

Figure 7:
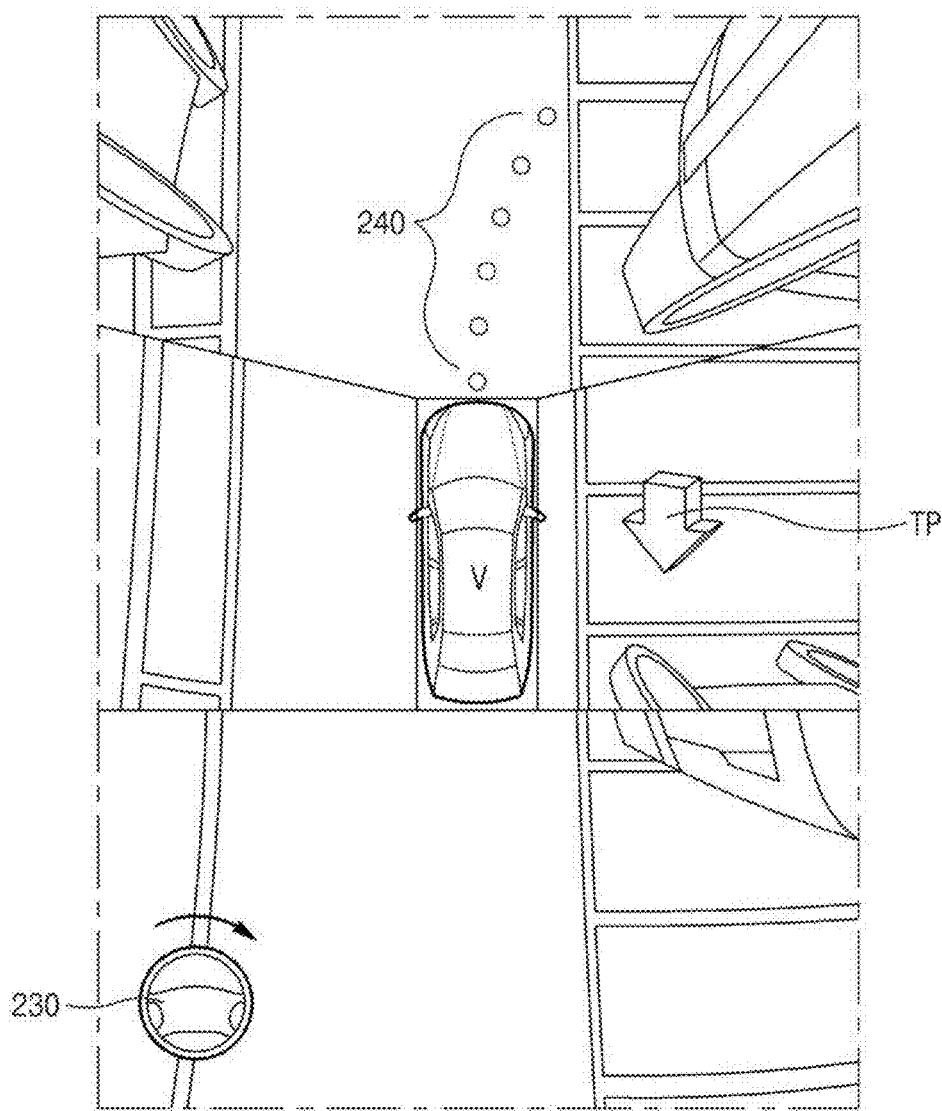

The controller 170 displays a parking route as illustrated in FIG. 7 in a form distinguished from the parking guidance information 210 and 220 illustrated in FIGS. 5 and 6 when the generation of the parking route depending on the steering input is impossible.

Figure 8:
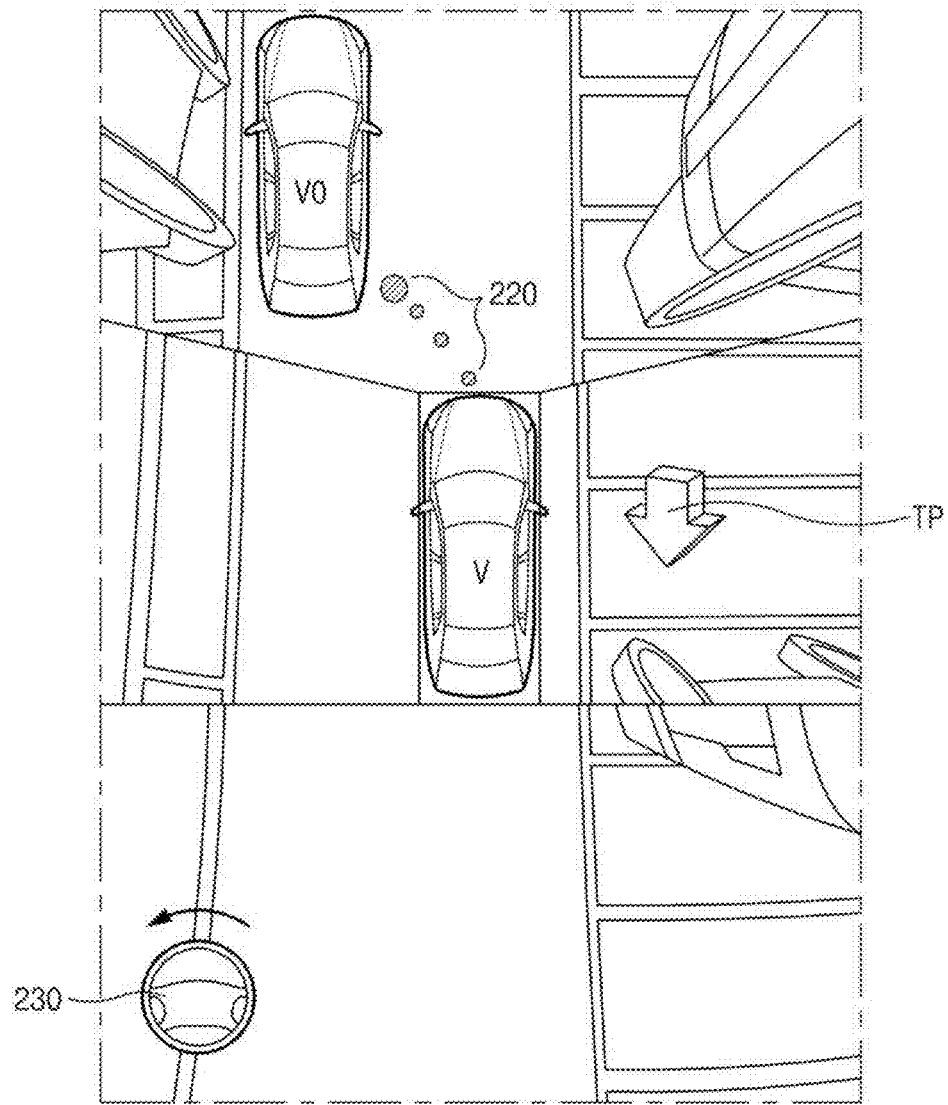

In addition, when an obstacle VO positioned around the vehicle V is sensed through the distance sensor 120, the controller 170 reflects a precise position of the obstacle to calculate a parking route. For example, as illustrated in FIG. 8, in the case in which the one-step parking route may not be generated due to the obstacle VO, the controller 170 calculates and displays only the multi-step parking route.

FIGS. 9 to 16 are views for describing selected parking route based parking guidance.

Figure 9:
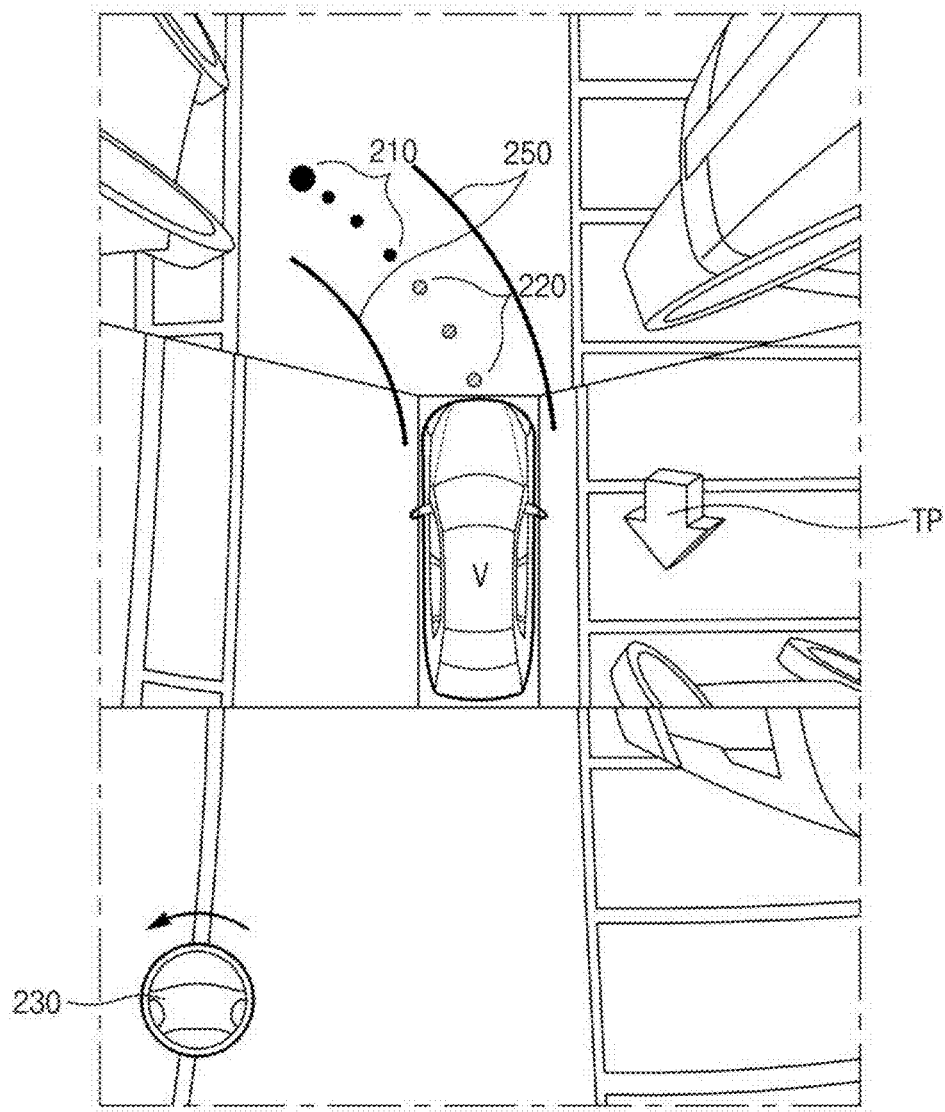
FIGS. 9 to 16 are views for describing selected parking route based parking guidance.

When the driver selects the parking route through the manipulation (the steering input) of the steering wheel and then inputs a confirmation command through the input unit 140 or the vehicle starts to move, the controller 170 fixes and displays the selected parking route, as illustrated in FIG. 9. In addition, the controller 170 displays a driving trajectory 250 depending on the steering input.

Figure 11:
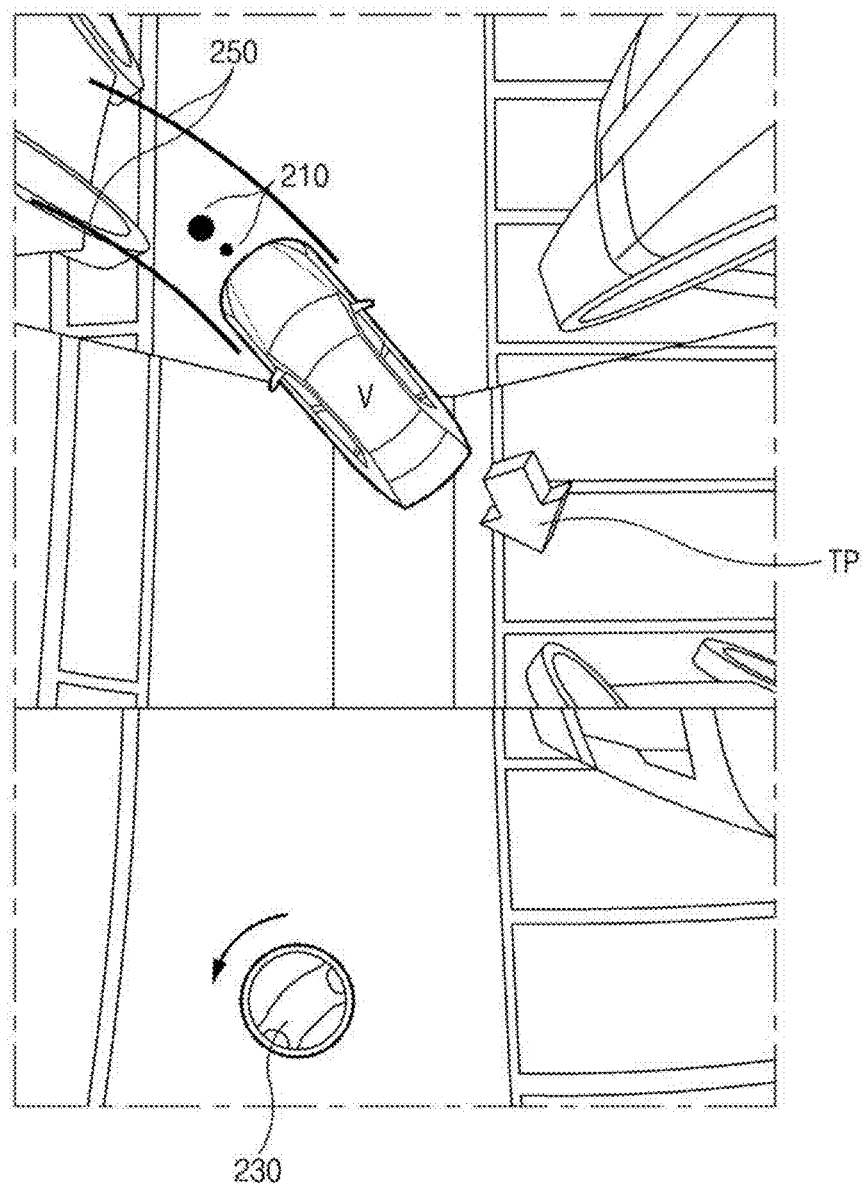

Then, the controller 170 detects the steering input and a position of the vehicle, displays a marker 230 corresponding to the detected steering input, and releases display of guidance markers 210 and 220 indicating driving routes depending on the position of the vehicle. That is, as illustrated in FIGS. 9, 11, and 12, when the vehicle V moves along the driving routes, the markers 210 and 220 displayed depending on the position of the vehicle disappear.

Figure 12:
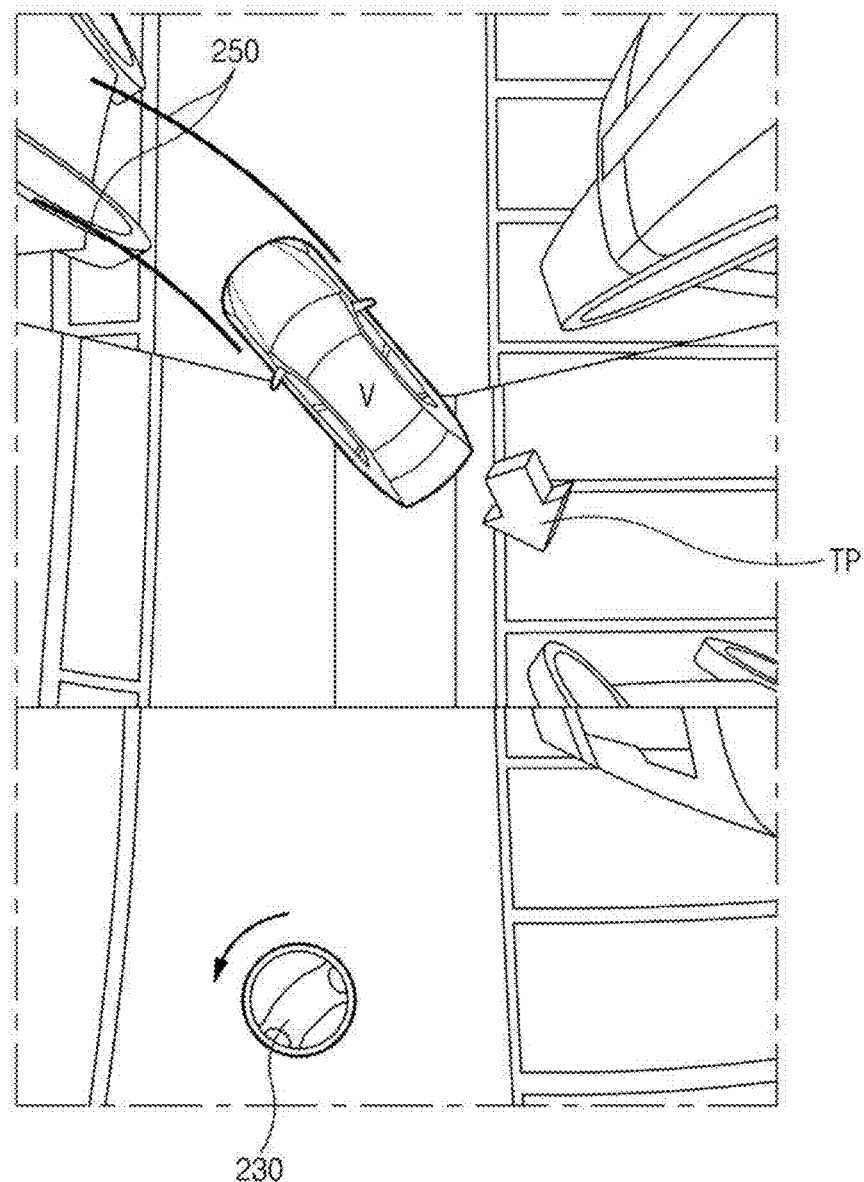

The controller 170 completes primary guidance when gear shifting is generated after the vehicle arrives at a target position along the driving routes selected by the driver, as illustrated in FIG. 12. In this case, the controller 170 visually and/or auditorily informs the driver that the primary guidance is completed.

Figure 10:
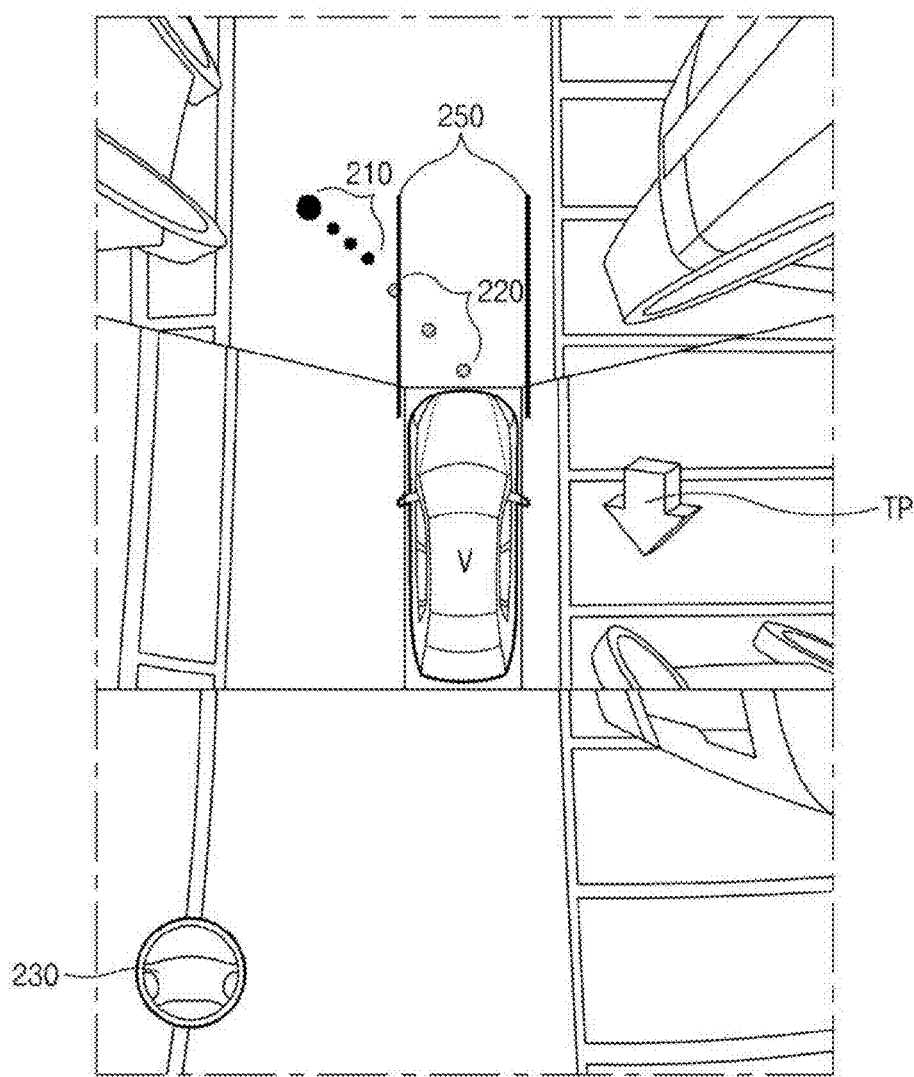

Meanwhile, as illustrated in FIG. 10, when a steering input is generated in a direction different from the selected parking routes, the controller 170 calculates and displays a driving trajectory 250 depending on the steering input. In this case, the controller 170 also displays the input steering input 230.

Figure 13:
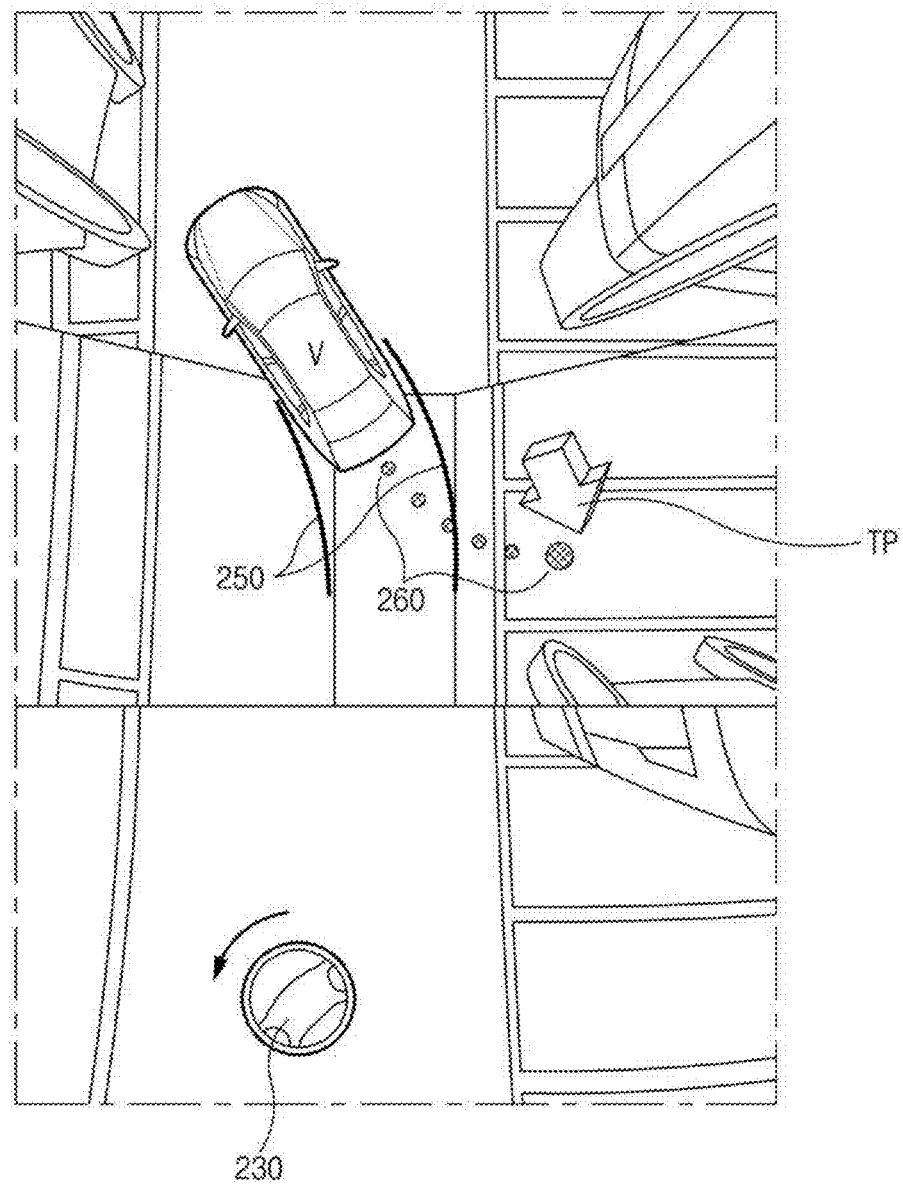

The controller 170 displays a secondary driving route depending on the steering input when the completion of the primary guidance and/or gear shifting is sensed. For example, the controller 170 displays guidance markers 260 along the second driving route, as illustrated in FIG. 13, when the gear shifting (shifting from a forward gear to backward gear) is sensed after the completion of the primary guidance. In this case, the controller 170 also displays a driving trajectory 250 depending on the steering input.

Figure 14:
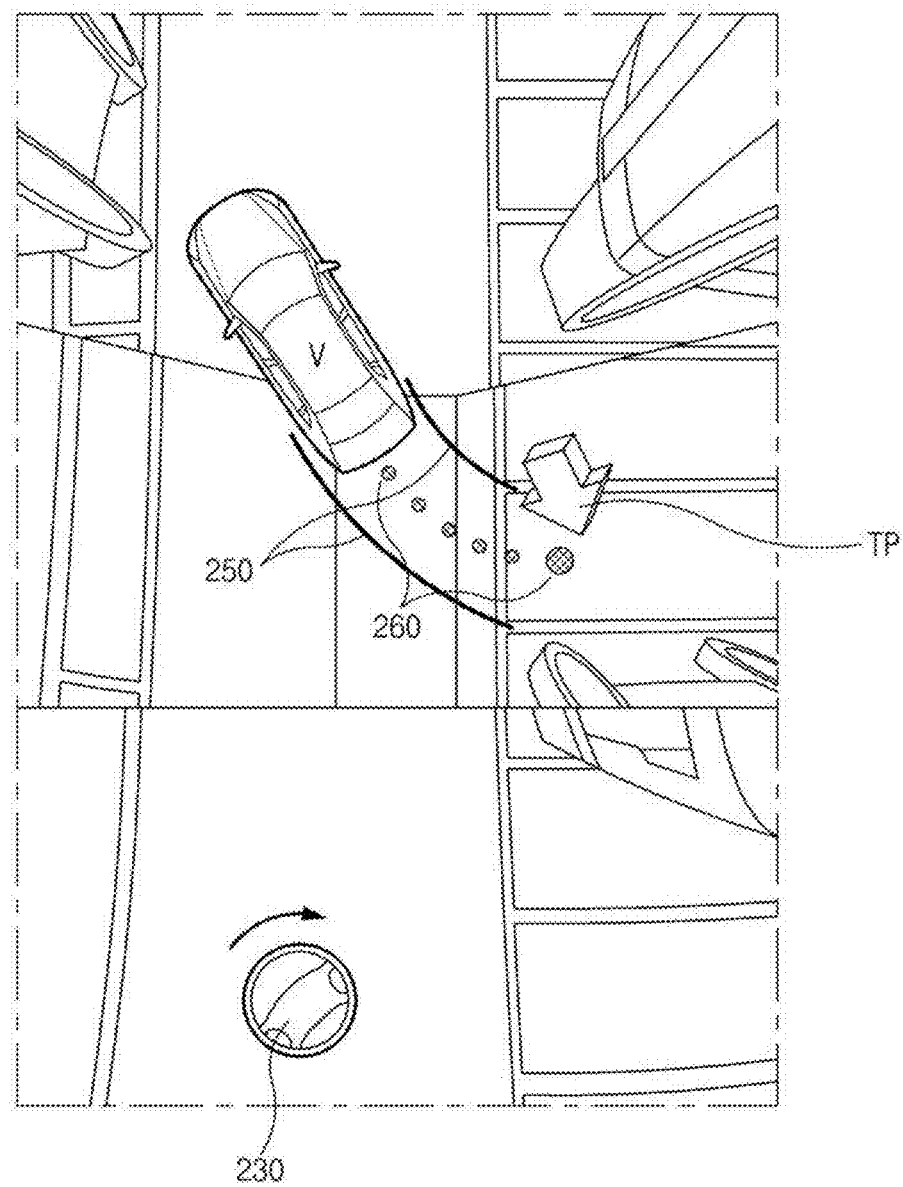
Figure 15:
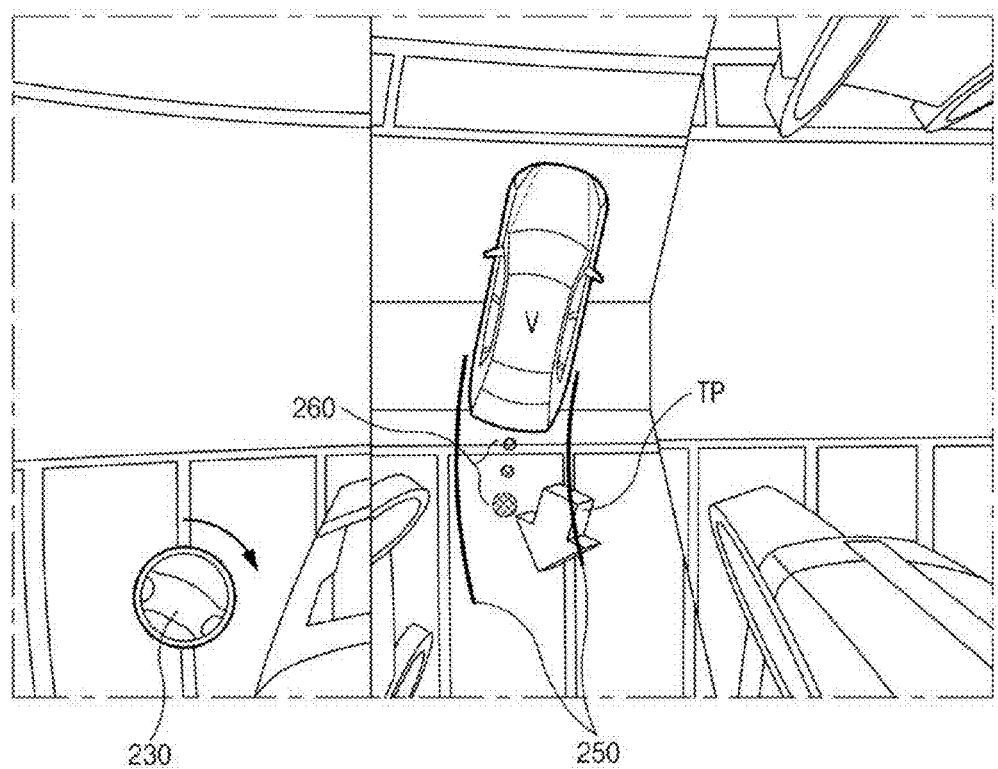

The controller 170 moves the vehicle toward the target parking space TP when the steering input 230 of the driver coincides with the secondary driving route 260, as illustrated in FIG. 14. The controller 170 releases display of a marker 260 indicating the secondary driving route depending on the position of the vehicle, as illustrated in FIG. 15.

Figure 16:
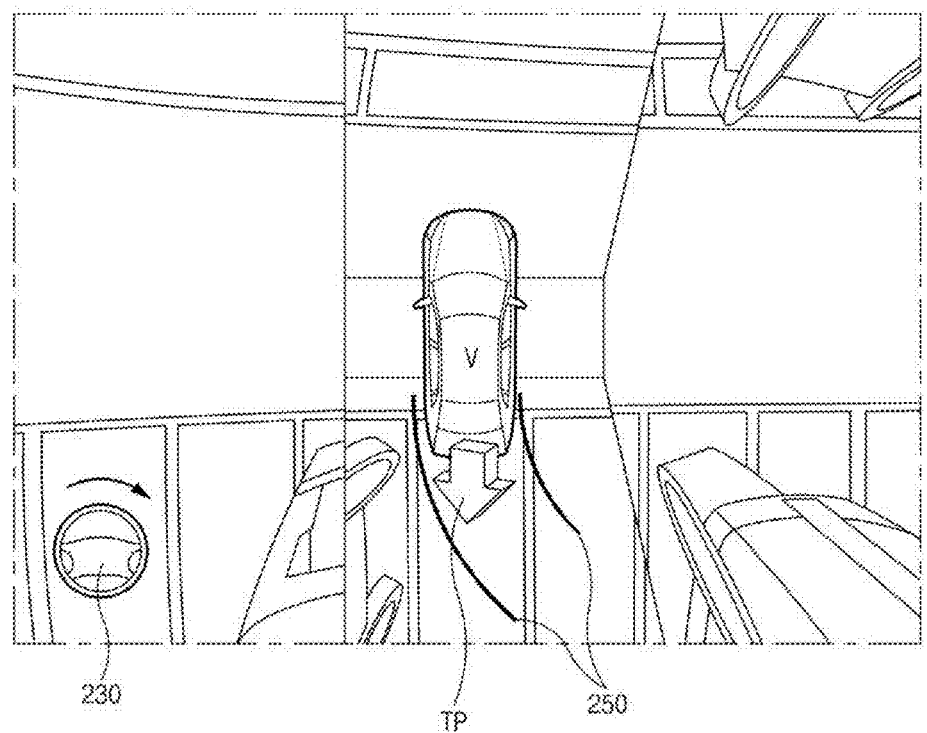

The controller 170 ends guidance and informs the driver of alignment of wheels, when the vehicle V arrives at a target position, as illustrated in FIG. 16.

Figure 17:
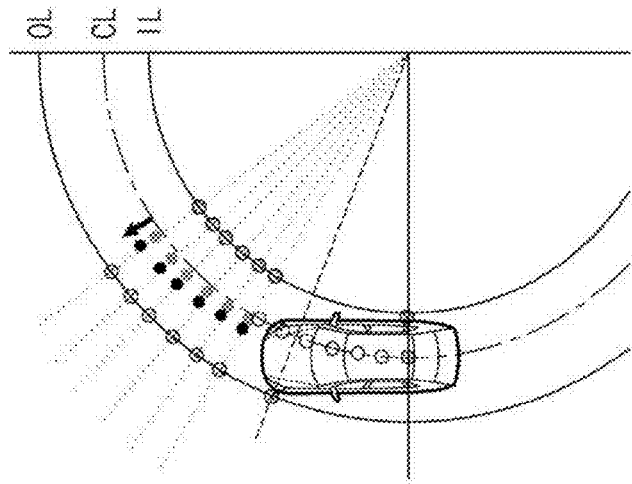
FIG. 17 is view for describing a guidance marker generating method according to the present disclosure.
Figure 17:
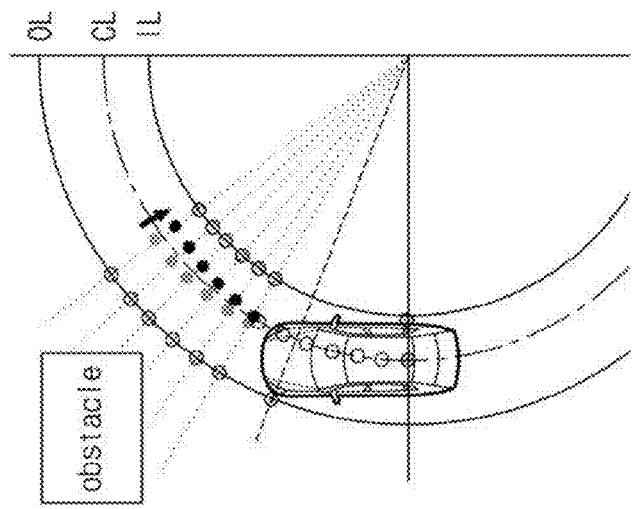
Figure 17:
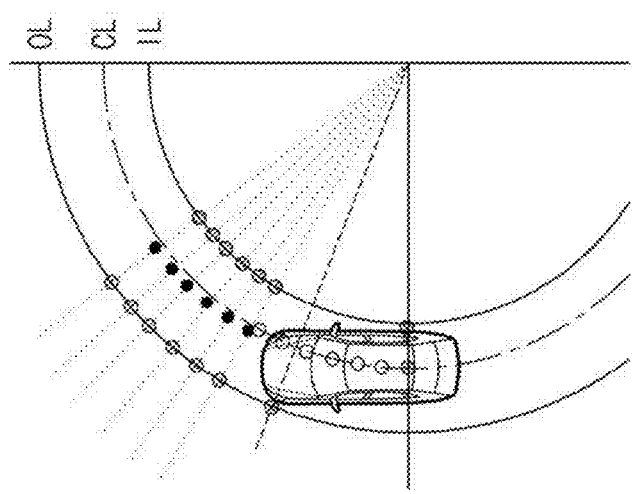

FIG. 17 is view for describing a guidance marker generating method according to the present disclosure.

Generally, a driving trajectory CL of the vehicle depending on the steering input is generated based on the center of a rear axle. However, it is not easy for the driver to move the vehicle along the guidance markers based on the center CL of the rear axle. Therefore, the guidance markers are displayed based on a front surface and a rear surface of the vehicle using a circumscribed circle OL and an inscribed circle IL of the vehicle.

Although displayed shapes of the guidance markers of the circumscribed circle OL and the inscribed circle IL are different from each other depending on forward movement and rearward movement of the vehicle, movement trajectories of the vehicle are the same as each other when the vehicle moves along the guidance markers.

Existing guidance markers are generated at positions based on the center CL of the circumscribed circle OL and the inscribed circle IL. Meanwhile, in the case in which an obstacle is positioned in the vicinity of a route, the guidance markers move toward the inscribed circle IL, and in the case of full turn, the guidance markers move toward the circumscribed circle OL in consideration of the future fluidity of the trajectory. An amount of the movement is determined depending on a position relation of the obstacle and vehicle specifications.

Figure 18:
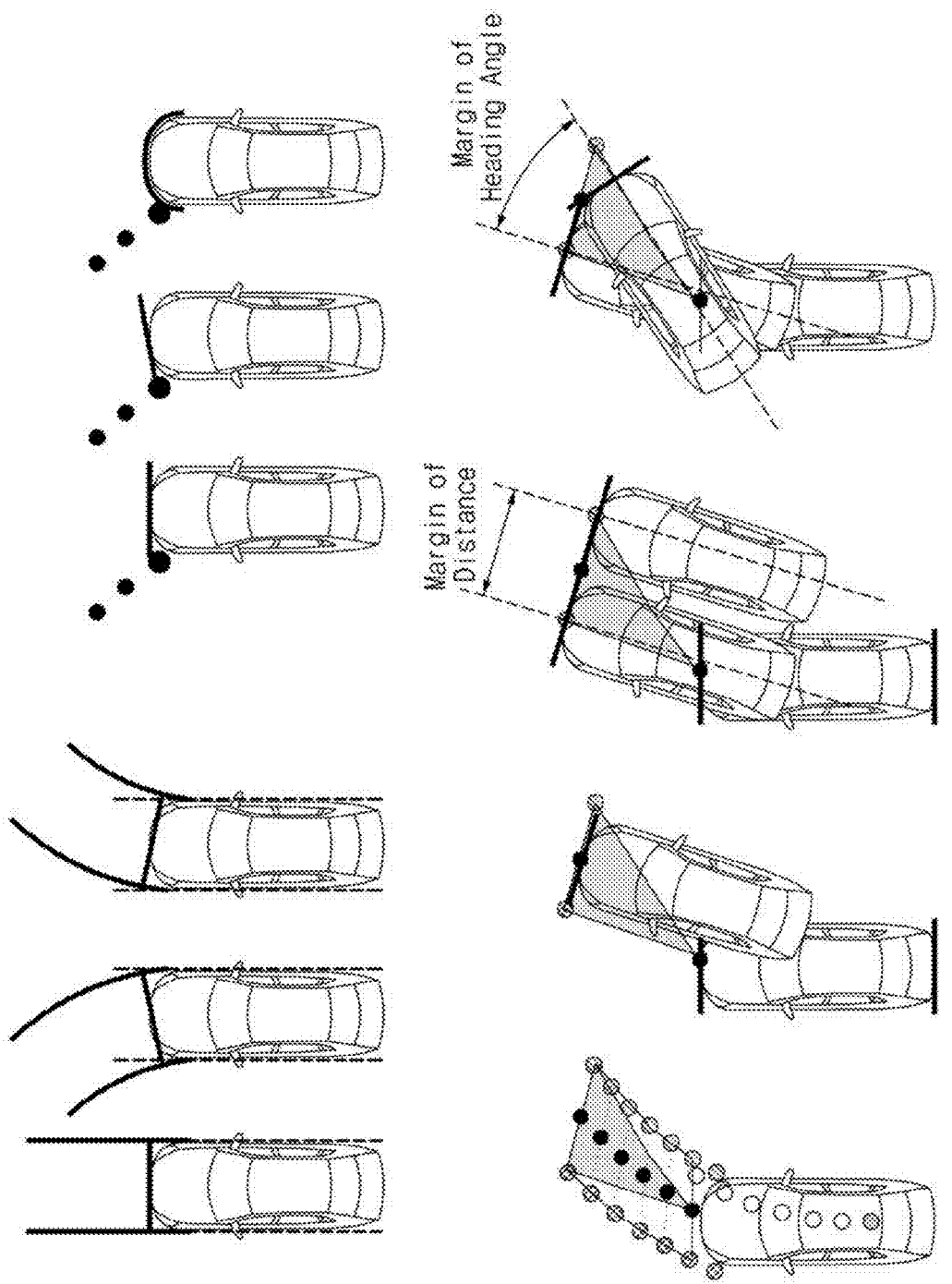
FIG. 18 is view for describing an extinguishment point in time of a guidance marker according to the present disclosure.

FIG. 18 is view for describing an extinguishment point in time of a guidance marker according to the present disclosure.

The controller 170 releases display of guidance markers when a position of a front surface part or a rear surface part of the vehicle is overlapped with those of the corresponding guidance markers. An instant at which a central point of a front surface of the vehicle meets the circumscribed circle and the inscribed circle becomes a limitation condition of a control, and a range thereof is an allowable value of a manipulation error. Since it is sufficient that the front surface part or the rear surface part of the vehicle arrives at the guidance markers, a margin of a manipulation may be provided to the driver.

The guidance markers are displayed up to a position at which the parking guidance is possible based on the front surface of the vehicle. The guidance markers may be implemented in various shapes such as a circular shape, a quadrangular shape, a triangular shape, and the like. The guidance markers are displayed at the same size, and a guidance marker of a limit point of a parking guidance-possible range is emphasized and displayed by a separate method (size enlargement, color change, or the like).

Displayed positions of the guidance markers are fixed at the time of selection and input of the driver or movement of the vehicle, and are disposed on the screen with reference to the movement of the vehicle. In addition, the driving trajectory of the vehicle depending on the steering input is displayed separately from the guidance markers. In addition, the parking guidance apparatus performs guidance so that the driver directly manipulates final parking when the guidance up to a point adjacent to the target parking space ends.

According to the present disclosure, it is possible to recognize the parking spaces to set the target parking space, track the target parking space, and provide the parking guidance to the driver on the basis of tracking information.

Therefore, in the present disclosure, the parking guidance method that decreases a burden of the driver, is efficient, and is accurate may be provided.

In addition, in the present disclosure, the parking guidance method that supports reliable and stable parking guidance, decreases a burden for the parking, and is easily conducted may be provided to the driver.

What is claimed is:

1. A parking guidance method comprising:
   recognizing, by a controller, parking spaces included in an image captured by an image acquirer in which a vehicle is to be parked within a parking lot;
   setting, by the controller, any one of the recognized parking spaces to a target parking space;
   receiving, by the controller, a steering position input of a steering wheel included in the vehicle;
   calculating, by the controller, a one-step parking route and a multi-step parking route corresponding to different steering position inputs, wherein the one-step parking route represents a first vehicle route of the vehicle traveling from a current position to the target parking space by performing a single steering manipulation of the steering wheel, and wherein the multi-step parking route represents a second vehicle route of the vehicle traveling from the current position to the target parking space by performing a plurality of steering manipulations of the steering wheel;
   displaying, by on a display screen, a first set of guidance markers corresponding to the one-step parking route and a second set of guidance markers corresponding to the multi-step parking route, both the first set of guidance markers and the second set of guidance markers displayed concurrently on a same image to be distinguished from each other;
   determining, by the controller, whether at least one of the one-step parking route or the multi-step parking route is possible based on an obstacle detected by a distance sensor; and
   guiding, by the controller, parking according to at least one of the first set of guidance markers or the second set of guidance markers corresponding to the at least one of the one-step parking route or the multi-step parking route determined to be possible.

2. The parking guidance method according to claim 1, wherein setting of any one of the recognized parking spaces to the target parking space comprises setting the target parking space while the vehicle is in a stopped state.

3. The parking guidance method according to claim 1, wherein the first set of guidance markers and the second set of guidance markers are displayed up to a position at which parking guidance is possible based on a front surface of the vehicle.

4. The parking guidance method according to claim 1, wherein the first set of guidance markers and the second set of guidance markers are displayed at the same size, and a guidance marker of a limit point of a parking guidance-possible range is emphasized and displayed.

5. The parking guidance method according to claim 1, wherein guiding the parking comprises a driving trajectory of the vehicle depending on the steering input is calculated and displayed while fixing and displaying the guidance markers.

6. The parking guidance method according to claim 1, further comprising releasing the display of the first set of guidance markers and the second set of guidance markers depending on a position of the vehicle at the time of parking the vehicle depending on the parking guidance.

7. The parking guidance method according to claim 6, wherein releasing the display of the guidance markers comprises releasing the display of the guidance markers when a front surface part or a rear surface part of the vehicle coincides with at least one of the first set of guidance markers or the second set of guidance markers.

8. A parking guidance apparatus comprising:
   an image acquirer configured to acquire an image around a vehicle;
   a distance sensor configured to sense an obstacle around the vehicle;
   a display configured to display various information; and
   a controller configured to control operations of the image acquirer, the distance sensor, a steering angle sensor, and the display, wherein the controller is further configured to:
      recognize parking spaces in which a vehicle is to be parked within a parking lot through the image acquirer and the distance sensor;
      set any one of the recognized parking spaces to a target parking space;
      detect a steering position input of a steering wheel included in the vehicle;
      calculate a one-step parking route and a multi-step parking route corresponding to different steering position inputs, wherein the one-step parking route represents a first vehicle route of the vehicle traveling from a current position to the target parking space by performing a single steering manipulation of the steering wheel, and wherein the multi-step parking route represents a second vehicle route of the vehicle traveling from the current position to the target parking space by performing a plurality of steering manipulations of the steering wheel;
      display a first set of guidance markers corresponding to the calculated one-step parking route and a second set of guidance markers corresponding to the calculated multi-step parking route on the display, both the first set of guidance markers and the second set of guidance markers displayed concurrently on the display so as to be distinguished from each other;
      determine whether at least one of the one-step parking route or the multi-step parking route is possible based on an obstacle detected by a distance sensor; and
      provide parking guidance according to at least one of the first set of guidance markers or the second set of guidance markers corresponding to the at least one of the one-step parking route or the multi-step parking route determined to be possible.

9. The parking guidance apparatus according to claim 8, wherein the controller is configured to calculate a driving trajectory depending on the steering input based on the guidance markers when the steering input based on the guidance markers is generated, and to display the calculated driving trajectory together with the guidance markers.

10. The parking guidance apparatus according to claim 8, wherein the controller is configured to:
    calculate a parking route from a current position of the vehicle depending on gear shifting to the target parking space at the time of the gear shifting; and
    display the guidance markers along the calculated parking route.

11. The parking guidance apparatus according to claim 8, wherein the controller is configured to release the display of the first set of guidance markers and the second set of guidance markers depending on a position of the vehicle.

12. The parking guidance apparatus according to claim 8, wherein the controller is configured to extinguish the first set of guidance markers or the second set of guidance markers when a front surface part or a rear surface part of the vehicle arrives at the corresponding first set of guidance markers or the second set of guidance markers.

13. The parking guidance apparatus according to claim 8, wherein the controller is configured to display the first set of guidance markers and the second set of guidance markers up to a position at which parking guidance is possible based on a front surface of the vehicle.

14. The parking guidance apparatus according to claim 13, wherein the controller is configured to display the first set of guidance markers and the second set of guidance markers at the same size, and to emphasize and display a guidance marker of a limit point of a parking guidance-possible range.

* * * * *